(No Model.)
G. W. HOOPER.
TROLLEY FOR ELECTRIC RAILWAYS.
No. 518,952. Patented May 1, 1894.
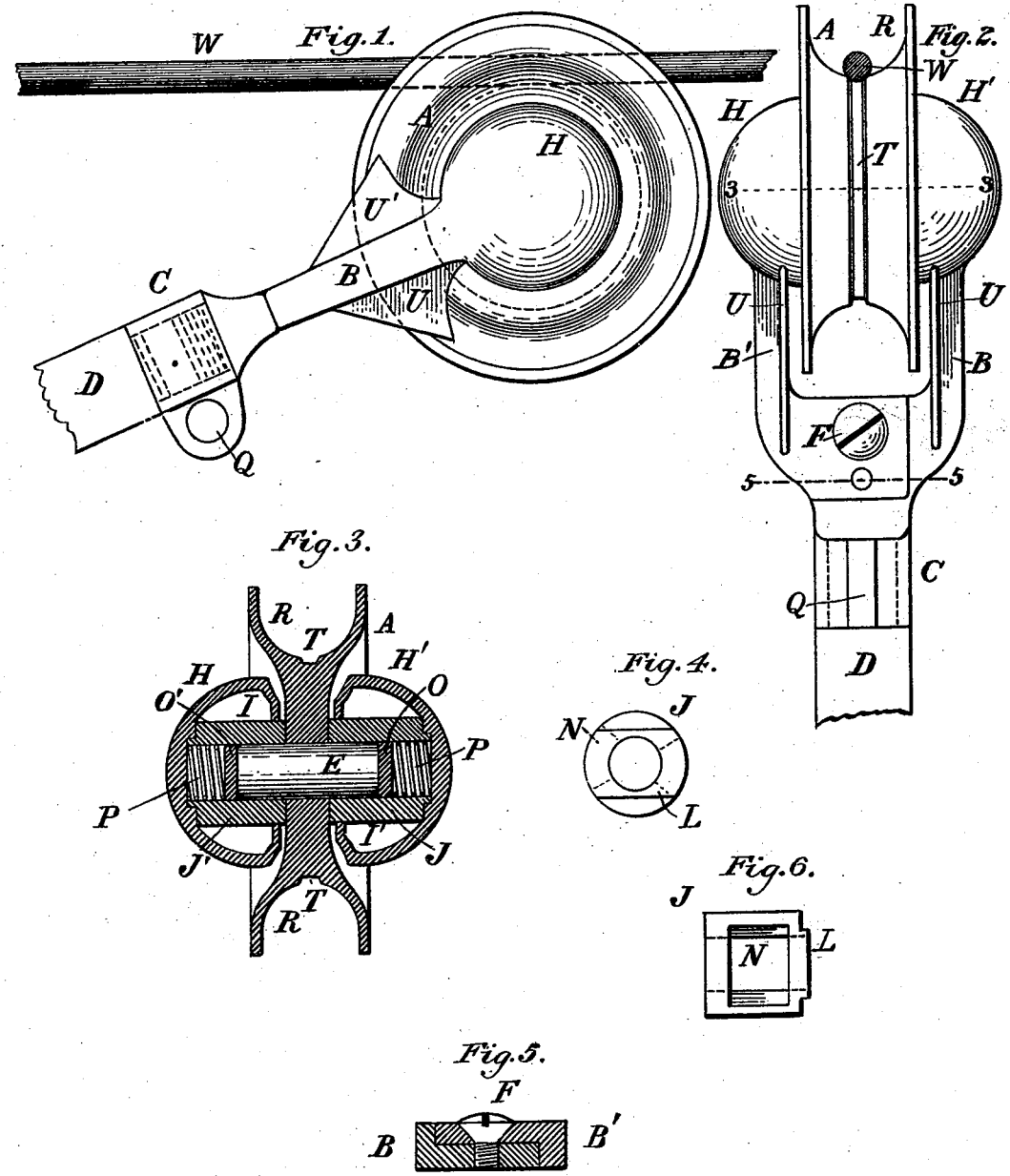
Witnesses:
R. F. Osgood
C. G. Crannell
Inventor:
Geo. W. Hooper.
By Geo. B. Selden.
Atty

UNITED STATES PATENT OFFICE.

GEORGE W. HOOPER, OF ROCHESTER, NEW YORK, ASSIGNOR, BY DIRECT AND MESNE ASSIGNMENTS, TO JAMES S. BAKER, OF SAME PLACE.

TROLLEY FOR ELECTRIC RAILWAYS.

SPECIFICATION forming part of Letters Patent No. 518,952, dated May 1, 1894.

Application filed June 1, 1893. Serial No. 476,305. (No model.)

*To all whom it may concern:*

Be it known that I, GEORGE W. HOOPER, a citizen of the United States, residing at Rochester, in the county of Monroe, in the State of New York, have invented certain Improvements in Trolleys for Electric Railways, of which the following is a specification, reference being had to the accompanying drawings.

My invention relates to certain improvements in the construction of the yoke, wheel and bearings of trolleys for electric railways, which improvements are fully described and illustrated in the following specification and the accompanying drawings,—the novel features thereof being specified in the claims annexed to the said specification.

In the accompanying drawings, representing my improvements in trolleys,—Figure 1 is a side view. Fig. 2 is an edge view. Fig. 3 is a section on the line 3—3, Fig. 2. Fig. 4 represents the outer end of one of the bushings. Fig. 5 is a section on the line 5—5, Fig. 2. Fig. 6 is a side-view of one of the bushings detached.

In the accompanying drawings, A represents the trolley-pulley, B B' the divided yoke-frame, and C the socket by which the frame is removably attached to the trolley-pole D.

E is the axle of the trolley-pulley, which revolves with the pulley.

The two parts of the yoke-frame are attached together by one or more screws or bolts F. Each of the parts of the divided yoke-frame is provided with an enlarged cap or boss, H H', inclosing lubricant receptacles I I', and sustaining the bushings J J' in which the projecting ends of the axle revolve. These caps are entirely closed on the outside, so that the lubricant cannot escape. The bushings at their inner ends are fitted tightly into the inner walls of the caps. At their outer ends, provision is made for preventing the rotation of the bushings by means of projecting lugs or recesses, which engage with each other. In the construction shown, the end of the bushing is provided with a projection L, which enters a correspondingly-shaped recess in the inner surface of the wall of the cap. The bushings are provided with one or more openings, N, through which the lubricant has access to the surface of the axle.

In order to secure a perfect electric circuit, I use the contacts, O O', which bear against the ends of the axle, being pressed inward by the springs P P'. These contacts are preferably made of disks of copper.

The two parts B B' of the divided yoke-frame are fitted together with suitable flanges, and secured by one or more screws F, as shown in Fig. 2, and in the sectional view, Fig. 5.

The yoke-frame is provided with a cord-loop Q, and a socket, C, preferably threaded, for attachment to the end of the trolley-pole. This construction permits the changing of the trolley-frame and pulley on the street, if desired, without the necessity of moving the car back to the shops.

The trolley wheel is provided with the usual groove R, but in addition the small supplementary groove T is formed centrally around the wheel at the bottom of the principal groove, for the purpose of guiding the wire W and insuring the running of the wheel centrally against it, so as to avoid wear on the inner surfaces of the flanges. This supplementary groove has been found in practice extending over a considerable period of time, to prevent unnecessary wear and to materially increase the life of the wheel. The self-lubricating feature of my invention enables the trolley to be run many thousand miles,—in some instances as many as ten or twelve thousand,—with a single oiling.

In order to prevent the trolley-wheel from catching against the guy-wires, I form on the parts of the divided yoke-frame, the inclined guards U U', which project outward to a suitable distance with their points located within the rims of the wheel.

I am aware that curved guides have been used with their points outside the periphery of the wheel. Such construction however is defective as it does not guard against the stay wires effectually. I am also aware that the axis of a trolley which has been provided with a single bushing interposed between it and ball bearings and such devices are not claimed.

I claim—

1. A trolley comprising a wheel and axle adapted to turn together, a yoke frame provided with lubricant receptacles H closed at their outer ends, bushings fixed in the receptacles and filling openings in the said receptacles, the interior of said bushings communicating freely with said receptacles and the bushings abutting against the wheel about the axle, substantially as set forth.

2. A trolley comprising a wheel and axle adapted to turn together, a yoke frame provided with lubricant receptacles H closed at their outer ends, bushings fixed in the receptacles and filling openings in the said receptacles, the interior of said bushings communicating freely with said receptacles and the bushings abutting against the wheel about the axle, and springs in the bushings bearing against the axle and against the bottom of the receptacles, substantially as set forth.

3. A trolley comprising a divided yoke-frame, bushings located in the frame within lubricant receptacles closed at their outer ends a trolley-wheel having an axle revolving in the bushings, springs in the bushings bearing against the ends of the axle, and the bottoms of the lubricant receptacles and means for preventing the rotation of the bushings, substantially as described.

4. A trolley comprising a divided yoke-frame, bushings provided with projecting lugs within recessed lubricant receptacles closed at their outer ends a trolley wheel having an axle revolving in the bushings, springs in the bushings bearing against the ends of the axle and the bottoms of the lubricant receptacles,—the lugs and recesses operating to prevent the rotation of the bushings, substantially as described.

5. A trolley comprising a divided yoke-frame, bushings provided with lateral openings, located in the frame within lubricant receptacles closed at their outer ends a trolley-wheel having an axle revolving in the bushings, and springs in the bushings bearing against the ends of the axle and the bottoms of the lubricant receptacles, substantially as described.

GEORGE W. HOOPER.

Witnesses:
JAMES S. BAKER,
JOHN A. STEWART.